June 17, 1930.   F. A. BEZEK   1,764,383
DEVICE FOR LOCKING A MOTOR VEHICLE IN GEAR
Filed Dec. 4, 1928
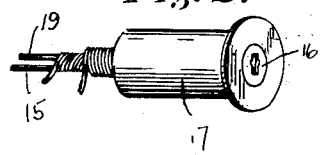
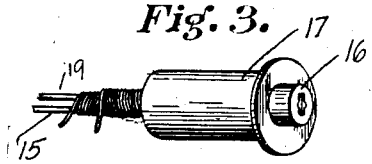
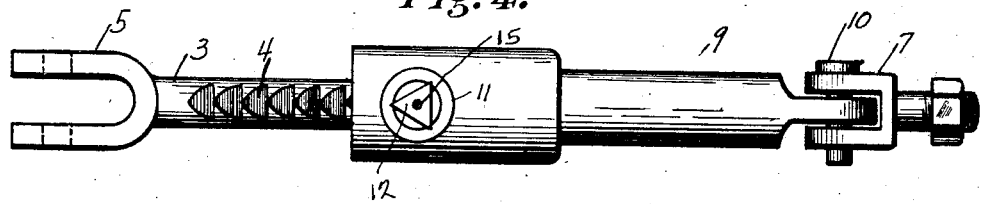
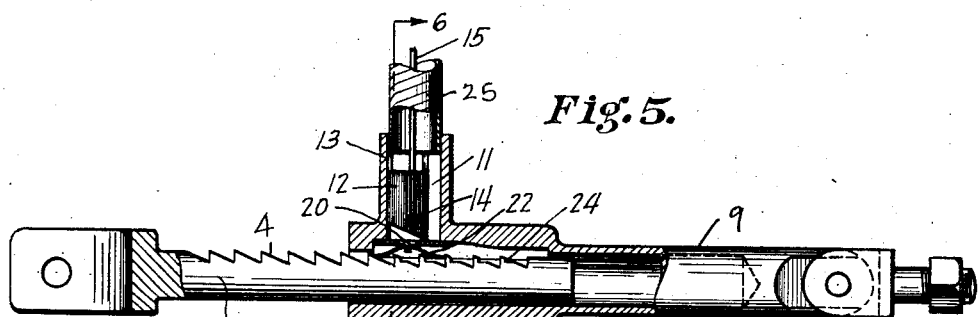
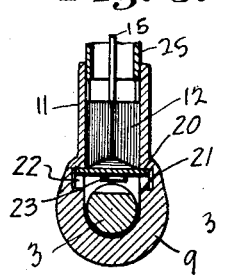
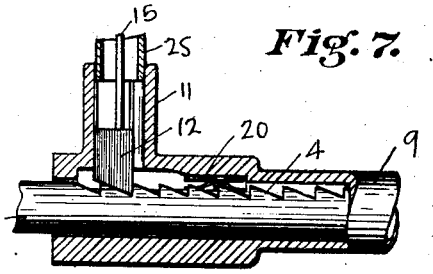
INVENTOR.
FRANK A. BEZEK
BY Lincoln Johnson
ATTORNEYS.

Patented June 17, 1930

1,764,383

UNITED STATES PATENT OFFICE

FRANK A. BEZEK, OF SAN FRANCISCO, CALIFORNIA, ASSIGNOR TO GENERAL AUTOMOTIVE EQUIPMENT COMPANY, OF CALIFORNIA

DEVICE FOR LOCKING A MOTOR VEHICLE IN GEAR

Application filed December 4, 1928. Serial No. 323,743.

This invention relates to an apparatus for locking a clutch or brake pedal on a motor vehicle in a depressed position, coincidentally with the shutting off of the motor, so as to make it impossible to move the vehicle by its own power until such time as the mechanism is released to allow the pedal to assume its normal extended position.

An object of the invention is to provide a locking device for locking either the clutch pedal or the brake pedal, in a position down against the floor-board of the vehicle so the vehicle cannot be moved by its own power until after the said locking mechanism has been released.

A further object of the invention is to provide a locking device attached to the clutch pedal of the vehicle which may be locked in a down position after the change speed gearing of the vehicle is in mesh, to thereby prevent movement of the vehicle by its own power, until after the gearing has been restored to a neutral position, the said locking apparatus preferably being controlled by the same apparatus which operates the vehicle ignition system on or off; said mechanism also being applicable to the brake pedal of the vehicle to lock the brakes of the vehicle, the said lock also being operated by the ignition controlling means.

Other objects of the invention are to provide a locking device of the character to be hereinafter described, that will be superior in point of simplicity, inexpensiveness of construction, positiveness of operation, and facility and convenience in use and general efficiency.

In this specification and the annexed drawings, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

In the accompanying one sheet of drawings:

Fig. 1 represents a diagrammatic cross section taken through the floor-board of the vehicle showing my locking device applied to one of the vehicle pedals and connected to a controlling device on the dashboard of the vehicle, for turning the pedal lock on and off.

Fig. 2 is a perspective view of the switch for the vehicle dash, in the locked position.

Fig. 3 is a view of the switch in the unlocked position.

Fig. 4 is an enlarged plan view of my pedal locking device.

Fig. 5 is a side elevation partly in section, of the locking device shown in Fig. 4, in the unlocked position.

Fig. 6 is a section taken through Fig. 5, on the line 6—6.

Fig. 7 is a cross section similar to Fig. 5, showing the locking device in the locked position.

In detail the construction illustrated in the drawings comprises a vehicle pedal 1, which may be either the clutch pedal or the brake pedal, secured on a cross bar 2 mounted on the vehicle. A bar 3 having a rack surface 4 on one side thereof, the teeth of which act as detents, is provided with a fork 5 at an end thereof, pivoted at 6 to the pedal 1. A forked bracket 7 is secured to a cross beam member 8 on the vehicle frame, said beam 8 being a part of the vehicle frame structure for supporting the rear end of the vehicle engine. I provide a guide for the lock bar 3; as illustrated, it is a hollow casing 9 which has one end thereof pivoted at 10 to the forked bracket 7. The rack bar 3 is slidably confined within the hollow interior of the casing 9.

The casing 9 has a hollow enlargement 11 on one side thereof which communicates with the hollow interior of the casing 9. A latch 12 having a triangular cross section, although it is to be understood the latch may be made of any other desired cross section, is slidably confined in the bore of the hollow enlargement 11. A series of guide slots 13 are formed in the bore of the enlargement 11 to guide the latch 12 in its lengthwise movement. The lower end of the latch 12 is beveled as at 14 to engage the rack notches 4 on the bar 3. The rear end of the latch 12 is connected by a wire or cable 15 to a plunger 16, which is a part of the key actuated switch mechanism confined in a casing 17, which is adapted to be mounted on the dashboard 18 of the vehicle. The plunger 16 reciprocates in and out within the switch casing 17 and is provided with a key actuated mechanism within, for locking the plunger in the inoperative position shown in Fig. 2, or, when unlocked, to allow the plunger to assume the extended position shown in Fig. 3. The plunger 16 is primarily adapted to control the electric ignition system of the vehicle, through a wire or wires 19. When the plunger is in the locked position shown in Fig. 2, the ignition system is inoperative, whereas, when the plunger is in the position shown in Fig. 3, the ignition system is operative.

In addition to using the plunger 16 for controlling the ignition system in the conventional manner, I secure the cable 15 to the plunger and utilize the movement of the plunger for engaging or disengaging the latch 12 with the rack bar 3. Although I have shown and described a particular form of switch, it is to be understood that any form of ignition switch operating device can be utilized in combination with my invention for operating the latch 12 synchronously with the turning of the ignition switch on or off.

In order that the latch 12 will only engage the rack bar 3 at a time when the ignition switch is turned off, I have interposed a slide plate 20 between the latch 12 and the notched surface of the rack bar 3. The plate 20 has its opposite ends confined in guideways 21 on opposite sides of the hollow interior of the casing 9. Bowed springs 22 on the under side of the plate 20 slide on the guideways 21 and serve to hold the plate 20 out of engagement with the rack bar. The plate 20 is provided with a tooth 23 on the under side thereof, to engage one of a series of notches 24 on the inclined face of the teeth 4, such notches 24 being provided only on the rearmost teeth of the rack. Thus, when it is desired to lock the latch in engagement with the rack, the operator presses the switch plunger 16 inward, thereby forcing the latch 12 downward into contact with the interposed plate 20 overcoming the upward spring tension exerted by said plate against the latch and causing the tooth on the under face of the plate 20 to engage one of the notches 24 in the teeth of the rack bar, so that the plate 20 will move downward and rearward with the rack bar as the said rack bar is urged downwardly and rearwardly within the casing 9 by movement of the pedal 1. When the pedal 1 has been moved into the desired depressed or locked position, the latch 12 engages one of the notches 4 and is held in engagement therewith by the plunger of the ignition switch 16, which locks itself in the position shown in Fig. 2.

The latch wire 15 is encased by an armored conduit 25 which extends from the housing 17 of the ignition switch to the casing 9.

Assuming the pedal 1 to be the clutch pedal, it is possible by my locking device, to lock said pedal in a down position against the floor-board or to so actuate and position the locking device that when the pedal is depressed, the locking device will be automatically engaged therewith to prevent the pedal from assuming its normally extended position, and thereby rendering said pedal inoperative for use except by unlocking the locking device. In the ordinary course of operation, the driver of a vehicle equipped with my locking device on one of the pedals thereof, would, upon locking the ignition system of the vehicle thereby force the latch 12 downwardly into engagement with the upper face of the slide plate 20. The pedal, if not depressed after the ignition switch has been turned off, would remain in its normally extended position. With the ignition switch locked off, the latch 12 would be thereby exerting a downward pressure on the plate 20 and the latch would be in readiness to engage the rack bar on the pedal just as soon as the slide plate 20 would be removed from beneath the latch, to permit engagement therewith said rack bar. The vehicle operator might depress the pedal before leaving the vehicle, which would have the effect of removing the plate 20 from beneath the latch coincidentally with the movement of the rack and thereby causing the latch to engage the rack to hold the pedal down and to prevent said pedal from assuming its extended position. In the event that the vehicle operator would not lock the pedal down before leaving the vehicle, the said pedal would be in readiness to be locked immediately that the said pedal should be depressed, either by the vehicle operator or an individual endeavoring to steal said vehicle. The locking apparatus on the pedal would not be apparent to a person depressing the said pedal, and therefore the locking apparatus would be in constant position to lock the pedal against operation each and every time that it would be depressed upon the ignition switch being in the locked off position. Once the pedal has been locked down, obviously it would be impossible to manipulate the vehicle in either a forward or rearward direction. With my apparatus it is possible to first place the change speed mechanism of the vehicle in gear and to thereafter lock the clutch pedal in such a position by means of the pedal lock operated coincidentally with the locking of the ignition system so as to prevent the said vehicle from being operated. Furthermore, the locking device could be applied equally as well to the brake pedal to lock the brakes of the vehicle and to thereby prevent indiscriminate use of vehicle.

Having thus described this invention, what

I claim and desire to secure by Letters Patent is:

1. In a combination, a vehicle pedal; a notched rack pivoted to said pedal, said notched rack having a groove in certain of the teeth thereof; a casing pivoted to the vehicle frame and having said rack slidably confined therein; a latch in the casing engageable with the rack; a plate interposed between the latch and rack, said plate having a tooth thereon to engage one of the grooves in the notched rack and to move with the rack; and means connected to the latch to move it into engagement with the plate and to engage the plate with the notched rack, whereby the said plate will be moved from beneath the latch when the rack is moved relative to the casing to thereby permit the latch to engage directly with the notches in the rack and to hold said rack immovable in the casing.

2. In combination, a clutch, a lever to disengage said clutch, a rack secured to said lever, a casing, in which said rack is slidably confined, a latch in said casing, engageable with said rack, means connected to said latch to move it into or from engagement with the rack, means intermediate said latch and said rack which prevents said engagement, spring means which holds said latch normally inoperative, and means actuated by the movement of the clutch lever, which removes said intermediate means upon compression of said spring means whereby said latch is freed to engage said rack.

3. In combination, a clutch, a lever to disengage said clutch, a rack pivotally secured to said lever, a casing pivotally secured to the frame, in which said rack is slidably confined, a latch in said casing, engageable with said rack, means connected to said latch to move it into or from engagement with the rack, means intermediate said latch and rack which prevents said engagement, spring means which holds said latch normally inoperative, and means actuated by the movement of the clutch lever, which removes said intermediate means upon compression of said spring means whereby said latch is freed to engage said rack.

4. In combination, a clutch, a lever to disengage said clutch, a rack secured to said lever, a casing, in which said rack is slidably confined, a latch in said casing, engageable with said rack, means connected to said latch to move it into or from engagement with the rack, means inside of said casing intermediate said latch and said rack which prevents said engagement, spring means which holds said latch normally inoperative, and means actuated by the movement of the clutch lever, which removes said intermediate means upon compression of said spring means whereby said latch is freed to engage said rack.

5. In combination, a clutch, a lever to disengage said clutch, a rack operated by said lever, a casing, in which said rack is slidably confined, a latch in said casing, engageable with said rack, means connected to said latch to move it into or from engagement with the rack, means intermediate said latch and said rack which prevents said engagement, spring means which holds said latch normally inoperative, and means actuated by the movement of the clutch lever, which removes said intermediate means upon compression of said spring means whereby said latch is freed to engage said rack.

6. In combination, a clutch, a lever to disengage said clutch, a rack secured to said lever, a guide for said rack, a latch engageable with said rack, means connected to said latch to move it into or from engagement with the rack, means intermediate said latch and said rack which prevents said engagement, spring means which holds said latch normally inoperative, and means actuated by the movement of the clutch lever, which removes said intermediate means upon compression of said spring means whereby said latch is freed to engage said rack.

7. In combination, a clutch, a lever to disengage said clutch, a bar secured to said lever, detents on said bar, a guide for said bar, means to engage said detents, means to prevent said engagement, and means actuated by the movement of the clutch lever which removes said last named means.

8. In combination, a clutch, a lever to disengage said clutch, means to lock said clutch lever in disengaged position, and spring-pressed means to hold said locking means inoperative under normal conditions, the movement of said clutch lever removing said holding means, upon compression of said spring whereby said clutch lever locking means is freed for operation.

9. In combination, a clutch, a lever to disengage said clutch, a bar, pivotally secured to said lever, detents on said bar, a pivoted guide for said bar, means to engage said detents, means to prevent said engagement, and means actuated by the movement of the clutch lever which removes said last named means.

10. In combination, a clutch, a lever to disengage said clutch, a bar pivotally secured to said lever, detents on said bar, a guide for said bar, means to engage said detents, means to prevent said engagement, and means actuated by the movement of the clutch lever which removes said last named means.

In testimony whereof, I have hereunto set my hand at San Francisco, California, this 9th day of November, 1928.

FRANK A. BEZEK.